(12) United States Patent
Zhang et al.

(10) Patent No.: US 10,575,008 B2
(45) Date of Patent: Feb. 25, 2020

(54) BANDWIDTH MANAGEMENT IN DEVICES WITH SIMULTANEOUS DOWNLOAD OF MULTIPLE DATA STREAMS

(71) Applicant: Apple Inc., Cupertino, CA (US)

(72) Inventors: Dazhong Zhang, Milpitas, CA (US); Hsi-Jung Wu, San Jose, CA (US); Peikang Song, San Jose, CA (US); Yunfei Zheng, Cupertino, CA (US); Chris Y. Chung, Sunnyvale, CA (US); Jae Hoon Kim, San Jose, CA (US); Xiaosong Zhou, Campbell, CA (US)

(73) Assignee: APPLE INC., Cupertino, CA (US)

( * ) Notice: Subject to any disclaimer, the term of this patent is extended or adjusted under 35 U.S.C. 154(b) by 161 days.

(21) Appl. No.: 15/169,072

(22) Filed: May 31, 2016

(65) Prior Publication Data

US 2016/0353118 A1    Dec. 1, 2016

Related U.S. Application Data

(60) Provisional application No. 62/169,144, filed on Jun. 1, 2015.

(51) Int. Cl.
| | |
|---|---|
| *H04N 19/184* | (2014.01) |
| *H04N 19/44* | (2014.01) |
| *H04N 19/37* | (2014.01) |
| *H04N 19/40* | (2014.01) |
| *H04N 19/85* | (2014.01) |

(52) U.S. Cl.
CPC ............ *H04N 19/44* (2014.11); *H04N 19/85* (2014.11)

(58) Field of Classification Search
None
See application file for complete search history.

(56) References Cited

U.S. PATENT DOCUMENTS

| | | | | |
|---|---|---|---|---|
| 4,890,257 | A * | 12/1989 | Anthias | G09G 5/14 715/807 |
| 5,600,346 | A * | 2/1997 | Kamata | G09G 5/14 715/804 |
| 5,689,800 | A * | 11/1997 | Downs | H04N 7/15 348/E7.076 |
| 7,385,995 | B2 * | 6/2008 | Stiscia | H04J 3/1682 370/412 |
| 7,660,245 | B1 * | 2/2010 | Luby | H04L 1/0041 370/230 |
| 8,027,473 | B2 * | 9/2011 | Stiscia | H04L 63/0428 370/397 |
| 8,255,552 | B2 * | 8/2012 | Witt | H03M 7/30 709/231 |
| 8,442,311 | B1 * | 5/2013 | Hobbs | G06T 9/00 382/166 |

(Continued)

OTHER PUBLICATIONS

IP.Com Search Report.*

*Primary Examiner* — Mohammad J Rahman
(74) *Attorney, Agent, or Firm* — BakerHostetler

(57) ABSTRACT

A method of managing resources on a terminal includes determining a number of downloaded video streams active at the terminal, prioritizing the active video streams, assigning a decoding quality level to each active video stream based on a priority assignment for each active video stream, and apportioning reception bandwidth to each active video stream based on an assigned quality level of each active video stream.

30 Claims, 3 Drawing Sheets

(56) References Cited

U.S. PATENT DOCUMENTS

| | | | | |
|---|---|---|---|---|
| 9,071,484 B1* | 6/2015 | Truax | ................ | H04L 29/06027 |
| 2002/0141498 A1* | 10/2002 | Martins | ................ | H04N 19/176 |
| | | | | 375/240.08 |
| 2004/0022322 A1* | 2/2004 | Dye | ................ | H04N 7/152 |
| | | | | 375/240.26 |
| 2004/0056900 A1* | 3/2004 | Blume | ................ | G06F 3/0481 |
| | | | | 715/807 |
| 2004/0201608 A1* | 10/2004 | Ma | ................ | G06F 3/0481 |
| | | | | 715/719 |
| 2004/0218099 A1* | 11/2004 | Washington | ................ | H04N 5/77 |
| | | | | 348/571 |
| 2006/0282855 A1* | 12/2006 | Margulis | ................ | G06F 3/1431 |
| | | | | 725/43 |
| 2007/0024705 A1* | 2/2007 | Richter | ................ | H04N 7/17318 |
| | | | | 348/142 |
| 2007/0057943 A1* | 3/2007 | Beda | ................ | G06T 13/00 |
| | | | | 345/419 |
| 2007/0115841 A1* | 5/2007 | Taubman | ................ | H04L 1/1812 |
| | | | | 370/252 |
| 2008/0184128 A1* | 7/2008 | Swenson | ................ | G09G 5/14 |
| | | | | 715/738 |
| 2009/0262838 A1* | 10/2009 | Gholmieh | ................ | H04L 1/007 |
| | | | | 375/240.27 |
| 2010/0080287 A1* | 4/2010 | Ali | ................ | H04L 1/0015 |
| | | | | 375/240.03 |
| 2011/0202966 A1* | 8/2011 | Gupta | ................ | H04N 7/173 |
| | | | | 725/114 |
| 2012/0307746 A1* | 12/2012 | Hammerschmidt | ................ | H04W 72/1242 |
| | | | | 370/329 |
| 2013/0219012 A1* | 8/2013 | Suresh | ................ | G09G 5/14 |
| | | | | 709/217 |
| 2014/0003450 A1* | 1/2014 | Bentley | ................ | H04N 7/15 |
| | | | | 370/468 |
| 2015/0341412 A1* | 11/2015 | Marchand | ................ | H04L 65/602 |
| | | | | 709/219 |

* cited by examiner

BANDWIDTH MANAGEMENT IN DEVICES WITH SIMULTANEOUS DOWNLOAD OF MULTIPLE DATA STREAMS

CLAIM FOR PRIORITY

This application benefits from priority of application Ser. No. 62/169,144, filed Jun. 1, 2015 and entitled "Bandwidth Management in Devices with Simultaneous Download of Multiple Data Streams," the disclosure of which is incorporated herein in its entirety.

BACKGROUND

The present disclosure relates to bandwidth management techniques in video coding applications supporting decode of multiple video streams in parallel.

Modern consumer devices support exchange of video between networked devices in a variety of contexts. For example, many consumer applications support download of video from websites on the Internet. Many others support videoconferencing applications where video is exchanged between terminals for display. And it is becoming increasingly common for such devices to perform video exchanges simultaneously for several video streams that are active in parallel.

Video data tends to consume greater bandwidth than other forms of data that are exchanged between such devices on a store and forward basis. Source video data often is coded according to compression algorithms that exploit redundancies in the videos' content in order to fit the video to bandwidth that can be made available for communication between devices. Such compression algorithms tend to be lossy processes, which cause decoded video to be a replica of the source video but possess some loss in video content. Coding losses, however, tend to be reduced as bandwidth allocations increase and, therefore, video coding system often attempt to maximize bandwidth allocations made to them to minimize coding errors.

Although video coding/decoding systems are capable of processing multiple video streams in parallel, such systems may process such streams independently of each other. Accordingly, when two coding sessions are established to process two coding streams, those sessions each may attempt to maximize the bandwidth allocated for their respective sessions. In such a case, requested bandwidth in aggregate may exceed a network's allocation of bandwidth to the terminal the processes the sessions or may exceed resources available within the terminal for such processes. And, indeed, as the capabilities of networked communications systems increase, the problems that are observed now with respect to parallel video streams may be encountered when downloading other types of data in such systems. Accordingly, there is a need in the art for a coordinated bandwidth management scheme for a device that supports parallel coding and/or decoding of multiple data streams.

DETAILED DESCRIPTION

A method of managing resources on a terminal includes determining a number of downloaded video streams active at the terminal, prioritizing the active video streams, assigning a decoding quality level to each active video stream based on a priority assignment for each active video stream, and apportioning reception bandwidth to each active video stream based on an assigned quality level of each active video stream.

Embodiments of the present disclosure provide techniques for managing terminal resources when processing multiple streams of data. A number of downlink streams that currently are active may be determined. The different streams may be prioritized according to characteristics of the streams and, based on their relative priorities, decoding quality levels may be assigned to the streams. A device may apportion reception bandwidth to the streams based on their assigned quality levels.

Figure 1:
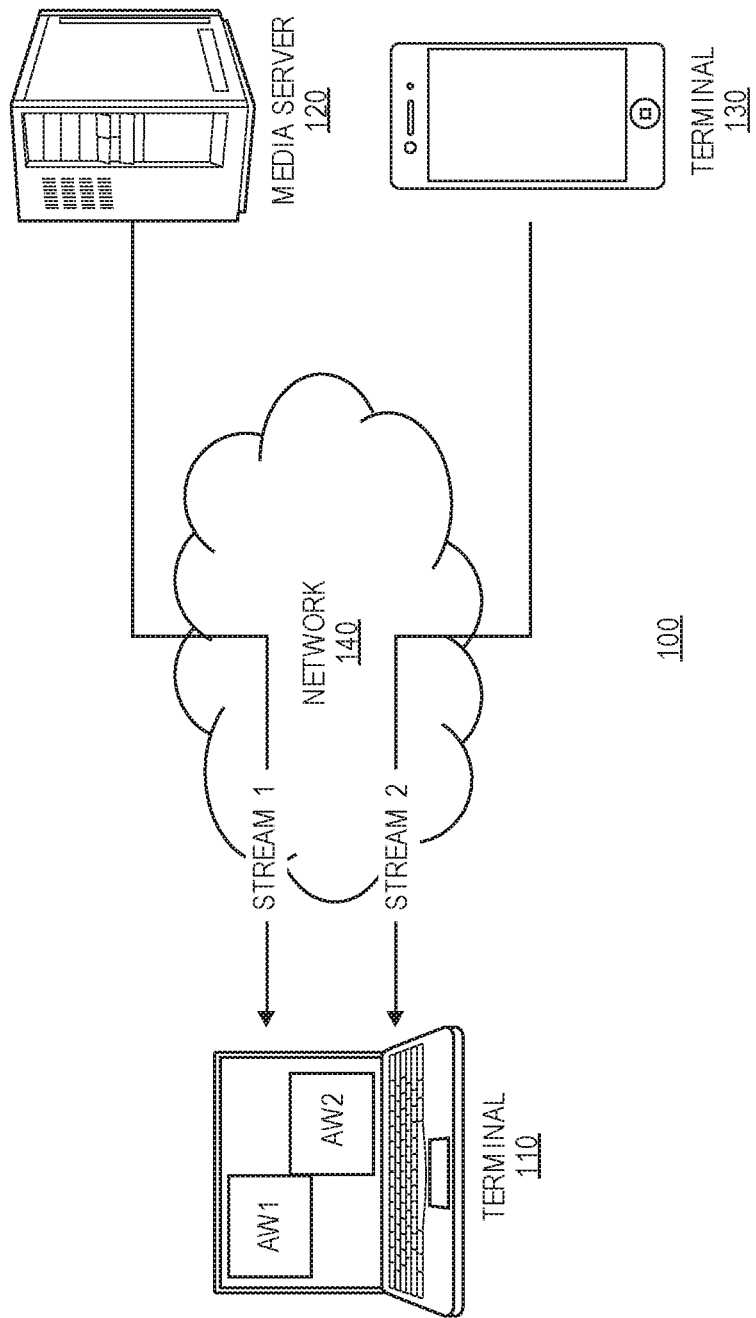
FIG. 1 illustrates a simplified block diagram of a video delivery system according to an embodiment of the present disclosure.

FIG. 1 illustrates a simplified block diagram of a video delivery system 100 according to an embodiment of the present invention. The system 100 may include a plurality of terminals 110-130 interconnected via a network 140. Certain terminals 120, 130 may code video data for transmission to another terminal 110 via the network 140. The terminals 110 that receive coded video data may decode the coded data and consume video data recovered therefrom, typically by displaying the decoded video or by storing it.

A video coding system 100 may be used in a variety of applications. In a first application, a pair of terminals 110, 130 may support real time bidirectional exchange of coded video to establish a video conferencing session between them. In another application, a terminal 120 may code pre-produced video (for example, television or movie programming) and store the coded video for delivery to one or, often, many downloading terminal(s) 110. Thus, the video being coded may be live or pre-produced, and the terminal 120 may act as a media server, delivering the coded video according to a one-to-one or a one-to-many distribution model. For the purposes of the present discussion, the type of video and the video distribution schemes are immaterial unless otherwise noted.

A decoding terminal 110 may receive coded video from a plurality of other terminals 120, 130 simultaneously. The decoding terminal 110 may communicate with each of the other terminals independently of its communications with the other terminals. Thus, a first terminal 120 may deliver coded video to the decoding terminal 110 in a first communication channel (called a "stream") that is independent of a second stream established between the decoding terminals 110 and terminal 130. The example illustrated in FIG. 1 may be appropriate in a use case where an operator receives streaming video from a content publisher on the Internet (media sever 120) while at the same time, the operator is engaged in a videoconference with another terminal 130. Decoded content from each of the streams may be rendered by the decoding terminal 110 in simultaneously active application windows AW1, AW2.

In FIG. 1, the terminals 110-130 are illustrated as smart phones, servers and personal computers respectively but the principles of the present invention are not so limited. Embodiments of the present invention find application with computers (both desktop and laptop computers), tablet computers, computer servers, media players, dedicated video conferencing equipment and/or dedicated video encoding equipment.

The network 140 represents any number of networks that convey coded video data between the terminals 110-130, including for example wireline and/or wireless communication networks. The communication network 140 may exchange data in circuit-switched or packet-switched channels. Representative networks include telecommunications networks, local area networks, wide area networks and/or the Internet. For the purposes of the present discussion, the architecture and topology of the network 140 are immaterial to the operation of the present invention unless otherwise noted.

Figure 2:
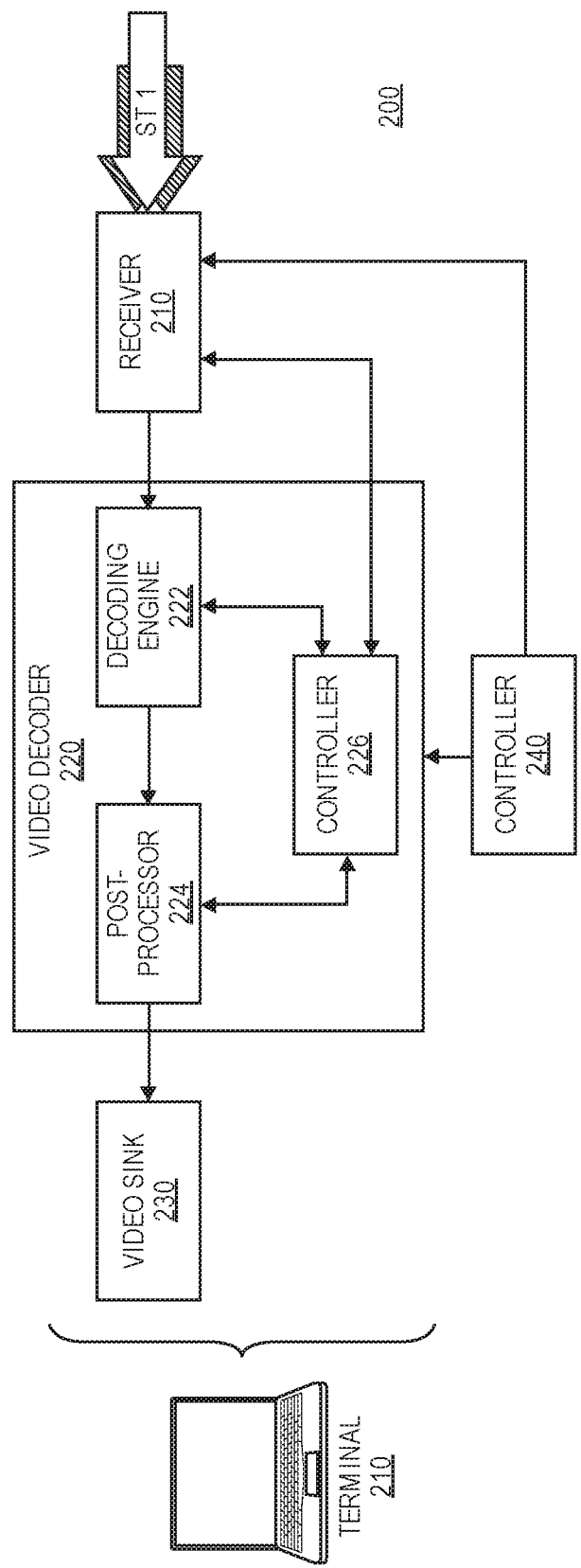
FIG. 2 illustrates a functional block diagram with components of a receiving terminal according to an embodiment of the present disclosure.

FIG. 2 is a functional block diagram illustrating components of a receiving terminal 200 according to an embodiment of the present disclosure. The second terminal 200 may include a receiver 210 to receive coded video data from the network and, optionally, to transmit data to the channel; a video decoder 220 that decodes coded data; and a video sink 230 that consumes the video data.

The receiver 210 may receive a data stream ST from the network and may route components of the data stream to appropriate units within the terminal 200. Although FIG. 2 illustrates functional units for video coding, terminals 200 typically will include decoding systems for audio components of the coded video and perhaps other processing units (not shown in FIG. 2). Thus, the receiver 210 may pass coded video data to the video decoder 220.

The video decoder 220 may perform decoding operations that invert coding operations performed by another terminal (FIG. 1) to prepare the coded video data. The video decoder may include a decoding engine 222, a post-processor 224 and a controller 226. Typically, the coded video data adheres to a governing protocol, such as ITU H.263, H.264 or H.265 (also known as "HEVC"), which defines a syntax of the data stream and decoding processes for coded data. The decoding engine 222 may perform decoding processes that are indicated by the coded data (and the governing protocol), which may include entropy decoding, de-quantization and transform decoding. Quantization/de-quantization operations are lossy processes and, therefore, the recovered pixel block data likely will be a replica of source pixel blocks that were coded by a video coder (not shown) when the coded video data was prepared but they will include some errors. For pixel blocks coded predictively, the transform decoding may generate residual data; the decoding engine 222 may use motion vectors associated with the pixel blocks (which may be implied in some cases) to retrieve predicted pixel blocks from local storage (not shown) to be combined with the prediction residuals.

The post-processor 224 may perform other operations to condition the recovered video data for display. For example, the post-processor 224 may perform various filtering operations (e.g., deblocking filtering, anti-ringing filtering and the like), which may obscure visual artifacts in output video that are generated by the coding/decoding process. The video decoder 220 may output recovered video to a video sink for further processing.

The controller 226 may manage operation of the video decoder 220. The controller 226 may enforce prioritization policies that may govern operation of the terminal 200.

The video sink 230 represents various hardware and/or software components in a terminal 200 that may consume the recovered video. The video sink 230 typically may include one or more display devices on which recovered video may be rendered. Alternatively, the video sink 230 may be represented by memory system that stores the recovered video for later use. The video sink 230 also may include one or more application programs that process the recovered video data according to controls provided in the application program. In some embodiments, the video sink may represent a transmission system that transmits the recovered video to a display on another device, separate from the terminal; for example, recovered video generated by a notebook computer may be transmitted to a large flat panel display for viewing.

The foregoing discussion of the receiver 210 and video decoder 220 illustrates operations that a terminal 200 may perform to receive and decode a single stream ST1 of coded video. In applications where the terminal 200 receives multiple streams, a terminal 200 may employ several instances of the receiver 210 and video decoder 220. Thus, the receiver 210 may receive multiple coded streams, parse them according to their constituent elements and forward the coded video from those streams to the video decoder 220. The video decoder 220 may decode the coded video of the several streams according to the coding protocols (e.g., H.263, H.264, H.265, etc.) according to which they were generated. Typically, the different instances of coded video will have been coded independently of each other and, therefore, the video decoder 220 may decoded each stream of coded video independently of the other streams. The video decoder 220 may output recovered video of the different streams to respective video sinks 230.

The terminal 200 may include a controller 240 to manage resources of the terminal 200 and to implement bandwidth control operations of the present disclosure.

Figure 3:
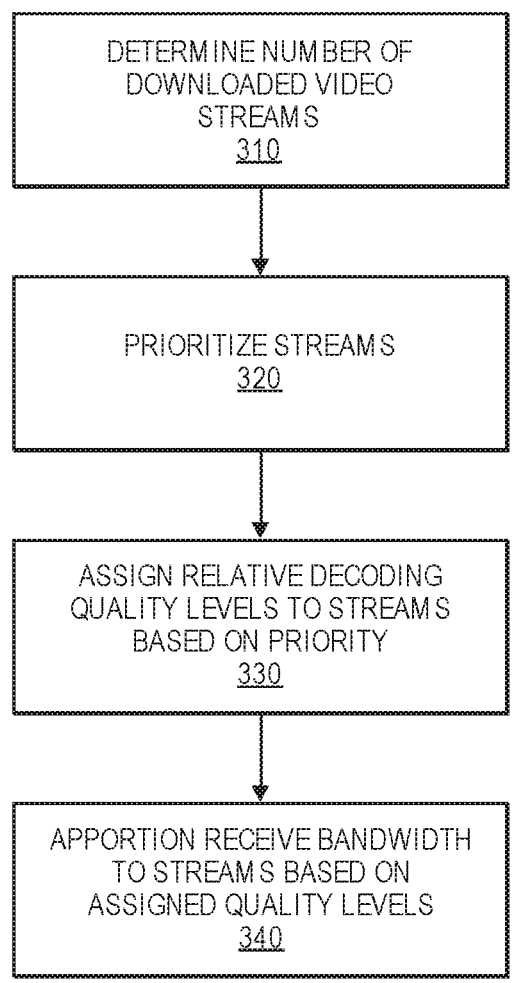
FIG. 3 illustrates a method to manage terminal resources according to an embodiment of the present disclosure.

FIG. 3 illustrates a method 300 to manage terminal resources according to an embodiment of the present disclosure. The method 300 may begin by determining the number of downlink video streams that currently are active at a terminal (box 310). The method 300 may prioritize the streams (box 320) and may assign decoding quality levels to streams based on the priority assignments (box 330). Thereafter, the method 300 may apportion reception bandwidth to the streams based on the assigned quality levels (box 340).

Stream prioritization may occur in a variety of ways. In a first embodiment, each stream may be assigned a priority level on a pro rata basis, which each stream being given equal priority to every other stream that currently is active. In another embodiment, each stream may be assigned a priority based on a size of an application window (FIG. 1) on which recovered video is being rendered. Thus, in a rendering environment in which two applications are output to application windows of equal size, the two applications may be given equal priority. If the rendering environment changes such that a first application window is maximized on a screen display and a second application window either is minimized or it is rendered in a thumbnail-sized inset within the first application window, the video corresponding to the maximized application window may be given a higher priority than the smaller application window. This principle may be extended to a rendering environment where recovered video is output to two different displays; recovered video that is output to a large, flat-panel display may be given higher priority than recovered video that is output to a smaller display (for example, a smartphone's local display).

Prioritization may be performed in a variety of ways. For example relative priorities may be assigned based on location of application windows in a display environment in which the streams may be rendered. A stream for an application window that is located in a center of a display may be given high priority than a stream for another application window that is located in a corner of the display. Similarly, a data stream for an application window that is obscured, either wholly or partially within a display environment may be given lower priority than another application window that is unobscured.

Relative priorities may be assigned based on application types. For example, applications that require relatively high levels of user interaction (e.g., gaming applications) may be given higher priority than other applications that require lower levels of user interaction (e.g., video). Similarly, priorities may be assigned based on the applications' relative tolerance for rendering latency. Video conferencing applications may have more stringent requirements for latency than video streaming or web browsing applications; the relative priorities may be developed from these requirements.

Similarly, apportionment of receive bandwidth may occur in a variety of ways. In a first example, a controller 240 (FIG. 2) may set a receive bandwidth for each of the receive streams. Responsive to this setting, a video coder may negotiate with far end terminals (FIG. 1) to set bandwidth of the coded video that those terminals deliver to the video decoder. Thus, when negotiating parameters of a videoconference, a terminal 110 (FIG. 1) may identify bandwidth limitations to the far end terminal 130 with which it establishes its coding session. Similarly, media servers 120 (FIG. 1) often store multiple copies of video that are coded to meet different data rates; the terminal 110 may request a coded version of video that meets the bandwidth limitations identified from performance of the method 300 of FIG. 3.

In another embodiment, the controller 240 may alter operating parameters of a receiver 210 within the terminal. The receiver 210 may operate according to a predetermined set of network protocols, such as the Transmission Control Protocol ("TCP") and/or the User Datagram Protocol ("UDP"). Based on an apportionment of receive bandwidth, the controller 240 may alter receive buffer sizes under which these protocols operate for the different streams, which in turn may alter the rate at which the receiver 210 can receive data for the streams. In this manner, the receiver 210 may reject received data of a given stream that exceeds a bandwidth allocation imposed by the method 300. Many network protocols inherently include mechanisms to alter communication data rates in response to rejections issues by receivers and, therefore, a far end terminal that issues coded video that has been rejected by a receiver may respond by lowering the data rate at which it codes the video data.

In another embodiment, as a decoding terminal 200 alters bandwidth assigned to different streams, it may communicate with a far end terminal to alter other coding parameters to be applied to coded video data. For example, a decoding terminal 200 may cause an encoder to increase a level of Forward Error Coding ("FEC"), which protects against transmission errors that may arise between the terminals. A terminal that receives multiple streams of coded video may cause the terminals that deliver coded video to them to increase the level of FEC that they apply to a level greater than would be applied by the far end terminal based solely on network conditions and the like. Similarly, the decoding terminal 200 may cause the far end terminals to increase a rate at which they provide refresh frames in coded video, which also protects against transmission errors.

In another aspect of the disclosure, Virtual Reality and Augmented Reality applications provide users with immersive experience and tend to consume huge amounts of data and network bandwidth. In order to render the final view, a terminal 110 may need to pull video content from multiple remote sources. For example, the terminal 110 may receive a video stream from a remote device capturing a person A; at the same time, the terminal 110 may also pull video streams from one or more webcams capturing the live scene of a beach from different perspectives. The terminal 110 may then combine the video streams into one view as if person A is standing on the beach. The user can then view the person A with different perspectives of the background beach. In this scenario, the terminal 110 may choose to give a higher priority to the video of person A, and allocate more bandwidth to the communication channel with the corresponding device. Furthermore, the terminal 100 may assign different priorities to different webcams for the beach depending on the user viewing perspective, i.e., allocate more bandwidth to the video source that the user is currently viewing.

The principles of the present disclosure have described various embodiments in which network bandwidth is consume by parallel video streams. The inventors perceive that similar problems likely will be encountered when networked communication systems increase their capabilities and exchange of other types of streaming data that test network bandwidth capabilities, for example, immersive gaming data and the like. Accordingly, the principles of the present disclosure may be extended to handle data streams beyond merely video streams.

The foregoing discussion identifies functional blocks that may be used in video processing systems constructed according to various embodiments of the present invention. In practice, these systems may be applied in a variety of devices, such as mobile devices provided with integrated video displays and/or wired communication systems such as videoconferencing equipment, media players and desktop computers, where application windows may be displayed on separate devices, possibly several separate devices. In some applications, the functional blocks described hereinabove may be provided as elements of an integrated software system, in which the blocks may be provided as separate elements of a computer program that are stored in memory and executed by a processing device. A non-transient computer readable medium may have program instructions for causing a computer to perform the functional blocks. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, the functional blocks described herein need not be provided as separate units. For example, although FIGS. 1 and 2 illustrate system components as separate units, in one or more embodiments, some or all of them may be integrated and they need not be separate units. Such implementation details are immaterial to the operation of the present invention unless otherwise noted above.

Further, the figures illustrated herein have provided only so much detail as necessary to present the subject matter of the present invention. In practice, such systems typically will include functional units in addition to those described herein, including audio processing systems, buffers to store data throughout the coding pipelines as illustrated and communication transceivers to manage communication with the communication network and counterpart devices. Such elements have been omitted from the foregoing discussion for clarity.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A method of managing bandwidth resources on a terminal, comprising:
   determining a number of application windows active at the terminal that display downloaded video;
   assigning priorities to video streams associated with the application windows based on characteristics of the application windows; and
   altering a bitrate of such video streams based on the streams' relative priorities, wherein the altering comprises setting one or more parameters of a network protocol, the one or more parameters of a network protocol comprise a rate of refresh frame.

2. The method of claim 1, wherein priorities are assigned to the video streams on a pro rata basis.

3. The method of claim 1, wherein priorities are assigned to the video streams based on relative sizes of the application windows in which they are displayed.

4. The method of claim 3, wherein the priority for an active video stream increases as a size of its application window increases.

5. The method of claim 1, wherein priorities are assigned to the video streams based on relative locations of the application windows in which they are displayed.

6. The method of claim 5, wherein the location of an application window in a center of the display is assigned a higher priority assignment than another application window in a corner of the display.

7. The method of claim 5, wherein an application window that is less obscured on the display is assigned a higher priority assignment than another application window that is more obscured on the display.

8. The method of claim 1, wherein priorities are assigned to the video streams based on types of applications for which the application windows are displayed.

9. The method of claim 8, wherein an application requiring a higher level of user interaction is assigned a higher priority assignment than another application requiring a lower level of user interaction.

10. The method of claim 1, wherein priorities are assigned to the video streams based on a relative size of different display devices on which the application windows are displayed.

11. The method of claim 1, wherein priorities are assigned to the video streams based on an assigned tolerance of the application window for rendering latency.

12. The method of claim 11, further comprising setting a coded version of video that meets each receive bandwidth.

13. The method of claim 11, further comprising altering buffer sizes for each active video stream.

14. The method of claim 1, wherein the altering further comprises setting a receive bandwidth for each active video stream based on their respective priorities.

15. The method of claim 1, further comprising combining multiple video streams from different sources into a single video stream.

16. A system for managing resources on a terminal, comprising:
   a receiver to receive coded video data from a network;
   a video sink device; and
   a decoder to decode the coded video data and including a processor and a controller to enforce prioritization policies including determining a number of downloaded streams active at the terminal and altering a bitrate of such streams based on the streams' relative priorities, wherein the altering comprises setting one or more protocol parameters of the network, the one or more parameters of a network protocol comprise a rate of refresh frame.

17. The system of claim 16, wherein the prioritization policies include:
   prioritizing the active video streams;
   assigning a decoding quality level to each active video stream based on a priority assignment for each active video stream; and
   apportioning reception bandwidth to each active video stream based on an assigned quality level of each active video stream.

18. The system of claim 17, wherein the assigning is on a pro rata basis and each active video stream receives equal priority.

19. The system of claim 17, wherein the assigning is based on a type of application.

20. The system of claim 17, wherein the assigning is based on a location of an application window on a display.

21. The system of claim 17, wherein the assigning is based on a size of an application window to render an active video stream.

22. The system of claim 21, wherein the priority of an application window increases as its size increases.

23. The system of claim 17, wherein the apportioning is based on the priority assignment for each active video stream combined into a single video stream.

24. A non-transient computer readable medium containing program instructions for causing a computer to perform a method of:
   determining a number of application windows active at a terminal that display downloaded video;
   assigning priorities to video streams associated with the application windows based on characteristics of the application windows; and
   altering a bitrate of such video stream based on the streams' relative priorities, wherein the altering comprises setting one or more parameters of a network protocol, the one or more parameters of a network protocol comprise a rate of refresh frame.

25. The method of claim 1, wherein the altering further comprises apportioning reception bandwidth such that video streams assigned a higher priority are apportioned more reception bandwidth than video streams assigned a lower priority.

26. A method of managing bandwidth resources on a terminal, comprising:
   determining a number of application windows active at the terminal that display downloaded video;
   assigning priorities to video streams associated with the application windows based on characteristics of the application windows; and
   setting one or more parameters of a network protocol, based on the video streams' relative priorities, causing an encoder of one or more of the video streams to change the encoder's coding parameters, wherein the causing comprises rejecting the reception of data of the one or more video streams that exceed a certain bandwidth.

27. The method of claim 26, wherein the causing an encoder of one or more of the video streams to change the encoder's coding parameters comprises rejecting the reception of the one or more video streams that exceed a certain bandwidth.

28. The method of claim 1, wherein the one or more parameters of a network protocol further comprise a level of forward error coding.

29. The system of claim 16, wherein the one or more parameters of a network protocol further comprise a level of forward error coding.

30. The medium of claim 24, wherein the one or more parameters of a network protocol further comprise a level of forward error coding.

\* \* \* \* \*